Patented Apr. 6, 1943

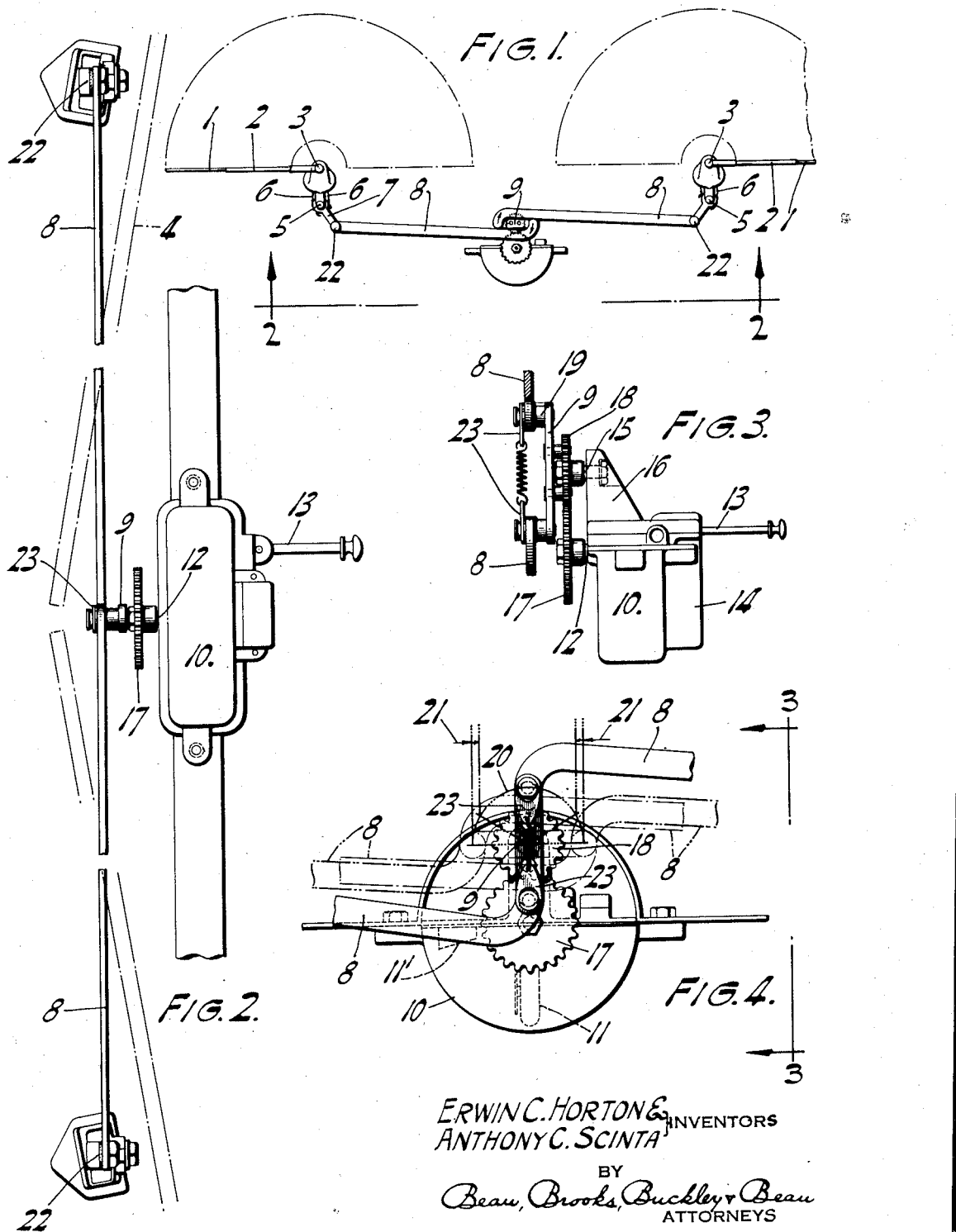

2,316,070

UNITED STATES PATENT OFFICE 2,316,070

WINDSHIELD CLEANER

Erwin C. Horton, Hamburg, and Anthony C. Scinta, Buffalo, N. Y., assignors to Trico Products Corporation, Buffalo, N. Y.

Application July 27, 1940, Serial No. 347,939

5 Claims. (Cl. 15—255)

This invention relates to a windshield cleaner and has particular reference to the stroking of the wiper and the mechanism for accomplishing the same.

In the present day windshield cleaner a suction operated motor is utilized to drive the oscillating wiper through an intermediate transmission. The wiper is moved by its motor at a uniformly fast speed throughout its entire stroke and then upon reversing the fluid pressure differential on the piston of the motor the wiper and the connected power transmission are suddenly reversed and carried through a return stroke of the wiper with a like uniform speed. The deceleration at the end of the stroke from the uniform fast speed and the acceleration at the beginning of each stroke to this operating speed are practically instantaneous with the reversal of the fluid pressure differential and results in the intermediate line of transmission between the motor and the wiper being subjected to rapid reversals, causing wear and tear on the mechanism and also emphasizing any noises of operation.

The present invention has for its object to provide a windshield cleaner (in which the power shaft has an amplitude of movement short of 180°) with means by which the terminal portions of the wiper movement are retarded or gradually tapered off before reversal of the wiper and increased slowly thereafter until the regulated speed for the major portion of the stroke has been attained thereby relieving the interposed transmission line of severe strain while rendering the mechanism more efficient as a cleaner.

In the drawing

Fig. 1 is a diagrammatic view of a windshield cleaner constructed in accordance with the present invention;

Fig. 2 is a bottom plan view about on line 2—2 of Fig. 1, depicting the relative arrangement of the motor and the wiper shaft, or shafts;

Fig. 3 is a transverse sectional view about on line 3—3 of Fig. 4 showing the motor in end elevation with parts of the transmission carried thereby; and Fig. 4 is an enlarged front elevation of the motor and the related parts of the transmission.

Referring more particularly to the accompanying drawing, the numeral 1 designates the wiper blades, 2 their actuating arms and 3 the arm carrying shafts which latter are disposed substantially normal to the respective sections 4 of the well known divided windshield. Each wiper shaft is connected by chains 5 to an intermediate shaft 6 which is equipped with a crank arm 7 joined by a link 8 to a crank or cross arm 9 operated by a motor, indicated at 10. The construction of these several parts from the driving crank 9 out to the wipers is generally shown in patent to E. C. Horton, No. 2,170,264, granted August 22, 1939.

The motor 10 is of the well known suction operated type now commonly used on the present day motor vehicle, the same having an arcuate chamber in which a vane-like piston 11 oscillates, the vane being fixed to a concentrically journaled shaft 12. The motor is connected to a source of suction by a control valve 13, and the suction influence is alternately connected to the motor chamber at opposite sides of the piston through automatic valve mechanism contained in the valve chamber 14. An example of the general construction for this type of motor may be seen in Patent No. 1,840,233, granted January 5, 1932, to H. Hueber. In a motor of this type, it is practically impossible to have the piston 11 operate through an arc approximately 180°. As a matter of fact the greatest sweep practical for a directly driven wiper is about 130° at one limit of which the piston engages a parking seat 11'. Consequently, the crank arm which has heretofore been carried directly by the motor shaft is likewise limited to the same angular displacement as the piston and because of the quick response of the piston to the reversal in the pressure differential the wiper movement is rapid throughout its entire stroke with the result that when the reversal in the wiper motion does occur the wiper and its driving mechanism will abruptly stop and likewise abruptly start.

According to the present invention means are incorporated in the transmission to gradually modify the wiper speed immediately preceding and succeeding the moment of reversal whereby the sudden jolting and jerking heretofore found in the transmission is alleviated and tempered to a degree which renders the reversal quiet and increases the period of usefulness for the cleaner mechanism. To this end the illustrated embodiment of the invention interposes in the power line a countershaft 15 which is conveniently journaled on a bracket 16 on the motor housing. The motor shaft 12 is operatively connected to the transmission or countershaft 15 in a manner to increase the amplitude of the latter to approximately 180°, this being accomplished herein by the intermeshing larger and smaller gears 17 and 18 fixed respectively to the power and the countershafts. The crank 9 is located on the countershaft to assume a horizontal position when the motor piston is at either limit of its operative stroke. Therefore, the crank pins 19 by which the adjacent ends of the links 8 are pivoted to the driving crank are therefore in the position depicted in Fig. 1 when the piston is in one limit position. As the piston moves to and from this position the effective movement on the wipers will be quite slow because the path of the crank pins is an arcuate one, as diagrammatically indicated at 20 in Fig. 4, and since their initial movements are nearly perpendicular and have very little of the horizontal component, the first and final twenty-five or thirty degrees of movement will impart very little motion to the wipers. Between these terminal portions of motion, however, the wipers move at the practical speed. These intervals of acceleration and deceleration are schematically represented at 21.

The driving crank arm 9 cooperates with each link 8 after the manner of a toggle. At the end of each stroke the countershaft 15 is substantially in a common plane with the crank pin 19 and the pivot 22, which latter connects the outer end of the link to the crank arm 7. During this approach to a common plane the wiper movement is gradually retarded for the reversal. In the illustration of Fig. 1, the pivotal axes at both ends of the two links are coplanar with the countershaft. However, the gradual variation in wiper speed immediately preceding and following the reversal will be accomplished if a single link is employed. Consequently, the cross arm may have its two crank portions angularly related, just so the arrangement of the several parts is such that the axes 15, 19 and 22 are substantially in a common plane when the wipers are at the ends of their strokes. Therefore, as the crank pins 19 approach a limit position the horizontal component will gradually reduce and finally become practically zero as the wipers gradually come to a position of rest from which they will gradually accelerate on the return stroke. The sudden starting and stopping of the wipers and their transmission lines are thus avoided and the noise of operation practically eliminated. Spring connected retainers 23 serve to hold the links 8 against accidental displacement from the crank pins.

From the foregoing it will be clear that a practical construction has been designed which is durable and quiet in use, and while the description has been given in detail it is obvious that the inventive principles here involved are capable of assuming other physical embodiments without departing from the spirit of the invention or the scope claimed.

What is claimed is:

1. In a windshield cleaner, spaced actuating shafts journaled to oscillate, each shaft having a crank part, wiper carrying shafts operatively connected to the first shafts by said crank parts to be driven thereby, a fluid motor having a power shaft oscillating with a stroke of less than 180°, a power transmitting shaft located adjacent the motor and geared to its power shaft to operate through an arc of substantially 180°, a cross arm fixed on the power transmitting shaft in a position to lie in a plane substantially in common with the plane of the outer ends of the crank parts when at the limits of oscillation of the actuating shafts, whereby the oscillatory movements of each shaft will have like periods of acceleration and deceleration for each stroke, and links operatively connecting the opposite ends of the cross arm respectively to the outer ends of the crank parts, the period of deceleration acting to retard the back and forth movement of the links and the actuating and carrying shafts substantially to a stop at the time of reversal whereby to substantially avoid any overtravel of the wiper at the ends of its strokes.

2. A mechanism for oscillating a wiper, comprising a motor having a housing with an arcuate shaped chamber, a shaft journaled concentrically in the chamber, and a vane-like piston fixed on the shaft and adapted to oscillate within the chamber through an arc of less than 180° and at a rapid rate throughout its arcuate travel, a countershaft journaled adjacent the motor shaft and connected by speed increasing gearing to the motor shaft for being driven thereby through a relatively greater arc approximating 180°, a crank arm fixed on the countershaft in a position to extend transversely of the windshield at the end of each stroke, a wiper actuating shaft mounted for oscillation remote from the countershaft, and a reciprocatory link pivoted at its inner end to the crank arm and operatively connected at its outer end to the actuating shaft, the arrangement being such that the back and forth movement of the link retards substantially to a stop before reversing thereby to minimize the tendency of overtravel of the wiper at the ends of its strokes.

3. In a windshield cleaner, spaced wiper actuating shafts journaled to oscillate, a fluid motor having a power shaft oscillating with a stroke of less than 180°, a power transmitting shaft carried by the motor and operatively connected to its power shaft by a speed increasing gearing to operate through an arc of substantially 180°, a cross arm fixed on the power transmitting shaft in a position to lie substantially in the same plane at its limits of oscillation, and links operatively connecting the opposite ends of the cross arm respectively to the wiper actuating shafts, the adjacent inner ends of the links being offset in opposite directions to arch over each other when in overlying relation for permitting the 180° of movement whereby the reciprocatory motion of the links will retard substantially to a stop before each reversal and thereby minimize the tendency of the wipers to overtravel at the ends of their strokes.

4. A windshield cleaner comprising a fluid motor having a housing with a chamber, a shaft journaled in the housing, an angularly extending member rigid with the shaft, a piston operatively connected to the shaft and operable back and forth in the chamber by fluid pressure at a substantially uniform movement throughout each stroke to oscillate the shaft, and valve mechanism acting quickly at the end of each stroke to reverse the fluid pressure and thereby rapidly change the direction of travel of the piston; a wiper, a wiper actuating shaft mounted remotely for oscillatory movement, a reciprocatory link operatively connected at its outer end to the actuating shaft, and motion modifying means interposed between and operatively connecting the angularly extending member to the inner end of the link for imparting to the latter a modified reciprocatory motion wherein the back and forth link movement gradually retards to a stop at the end of a stroke before reversing and then gradually accelerates from the top into its reverse stroke thereby acting to eliminate the inertia overtravel of the link and its connected wiper.

5. A windshield cleaner comprising a fluid motor having a housing with a chamber, a shaft journaled in the housing, an angularly extending member rigid with the shaft, a piston operatively connected to the shaft and operable back and forth in the chamber by fluid pressure at a substantially uniform movement throughout each stroke to oscillate the shaft, and valve mechanism acting quickly at the end of each stroke to reverse the fluid pressure and thereby rapidly change the direction of travel of the piston; a wiper, a wiper actuating shaft mounted remotely for oscillatory movement, a reciprocatory link operatively connected at its outer end to the actuating shaft, and motion modifying means interposed between and operatively connecting the angularly extending member to the inner end of the link for imparting to the latter a modified reciprocatory motion wherein the back and forth link movement gradually retards to a stop before reversing and thereafter gradually accelerates into its next stroke thereby acting to eliminate the inertia overtravel of the link and its connected wiper at the ends of the wiper strokes, said motion modifying means including an oscillatory power transmitting member operatively connected to and driven from the angularly extending member through an arcuate path, the outer end of the oscillating power transmitting member being pivotally connected to the inner end of the link.

ERWIN C. HORTON.
ANTHONY C. SCINTA.